(12) United States Patent
Chen et al.

(10) Patent No.: US 12,252,400 B1
(45) Date of Patent: Mar. 18, 2025

(54) PREPARATION METHOD FOR LITHIUM IRON PHOSPHATE CATHODE MATERIAL AND LITHIUM BATTERY

(71) Applicant: Hunan Yuneng new energy battery materials Co., LTD., Xiangtan (CN)

(72) Inventors: Tao Chen, Xiangtan (CN); Xinlong Huang, Xiangtan (CN); Yang Yu, Xiangtan (CN); Kun Cheng, Xiangtan (CN)

(73) Assignee: Hunan Yuneng new energy battery materials Co., LTD., Hunan (CN)

( * ) Notice: Subject to any disclaimer, the term of this patent is extended or adjusted under 35 U.S.C. 154(b) by 0 days.

(21) Appl. No.: 18/967,384

(22) Filed: Dec. 3, 2024

(30) Foreign Application Priority Data

Jun. 24, 2024  (CN) .......................... 202410819405.1

(51) Int. Cl.
| | |
|---|---|
| *H01M 4/02* | (2006.01) |
| *C01B 25/30* | (2006.01) |
| *H01M 4/04* | (2006.01) |
| *H01M 4/36* | (2006.01) |
| *H01M 4/58* | (2010.01) |

(52) U.S. Cl.
CPC ............... *C01B 25/30* (2013.01); *H01M 4/02* (2013.01); *H01M 4/04* (2013.01); *H01M 4/36* (2013.01); *H01M 4/58* (2013.01); *C01P 2006/40* (2013.01)

(58) Field of Classification Search
None
See application file for complete search history.

(56) References Cited

FOREIGN PATENT DOCUMENTS

| | | |
|---|---|---|
| CN | 105428648 A | 3/2016 |
| CN | 117317230 A | 12/2023 |

*Primary Examiner* — Carlos Barcena
(74) *Attorney, Agent, or Firm* — Valet Patent Service Limited (57) ABSTRACT

The present application belongs to the field of lithium battery technology, particularly relating to a preparation method for lithium iron phosphate cathode material and lithium battery. The method comprises: adding lithium source, iron source, phosphorus source, first carbon source, dopant, and dispersant into a solvent according to a preset ratio for mixing and grinding treatment to obtain the first mixture; Drying the first mixture and performing the first sintering in an inert gas atmosphere to obtain the lithium iron phosphate precursor; Adding borohydride, deionized water, second carbon source, and dispersant to the lithium iron phosphate precursor for pretreatment to obtain the lithium iron phosphate precursor mixture; After mixing, grinding, and drying the lithium iron phosphate precursor mixture, performing a second sintering in an inert gas atmosphere to obtain a coated doped type lithium iron phosphate cathode material.

7 Claims, 6 Drawing Sheets

PREPARATION METHOD FOR LITHIUM IRON PHOSPHATE CATHODE MATERIAL AND LITHIUM BATTERY

TECHNICAL FIELD

The present application belongs to the technical field of lithium batteries, particularly relating to a preparation method for lithium iron phosphate cathode material and lithium battery.

BACKGROUND

Lithium iron phosphate electrode material has an olivine structure. Since Li+ can only be transmitted along a one-dimensional channel, the diffusion coefficient of lithium ions is relatively low, the conductivity is poor, and the rate performance is low (i.e., the specific capacity is low).

The currently commonly used modification preparation methods for lithium iron phosphate comprise: element doping, crystal nanocrystallization, and surface coating. A single modification preparation method can no longer meet the needs of usage scenarios, and there is still a gap from the theoretical specific capacity of 170 mAh/g for lithium iron phosphate electrode material.

The prior art has the problem that the electrochemical performance of lithium iron phosphate cannot meet the requirements.

SUMMARY

The embodiments of the present application provide a preparation method of lithium iron phosphate cathode material and a lithium battery, aiming to solve the problem that the electrochemical performance of lithium iron phosphate cannot meet the requirements to a certain extent.

In the first aspect, the embodiments of the present application provide a preparation method of lithium iron phosphate cathode material, including:
- S11. adding lithium source, iron source, phosphorus source, first carbon source, dopant, and dispersant into a solvent in a preset ratio for mixing and grinding treatment to obtain a first mixture;
- S12. drying the first mixture and performing a first sintering in an inert gas atmosphere to obtain a lithium iron phosphate precursor;
- S13. adding borohydride, deionized water, second carbon source, and dispersant to the lithium iron phosphate precursor for pretreatment to obtain a lithium iron phosphate precursor mixture;
- S14. after grinding and drying the lithium iron phosphate precursor mixture, performing a second sintering in an inert gas atmosphere to obtain a coated doped type lithium iron phosphate cathode material.

The present application provides a preparation method for lithium iron phosphate cathode material. The first mixture undergoes a reduction reaction and the first carbon coating during the first sintering to obtain a lithium iron phosphate precursor. By adding borohydride nanosheets or borohydride nanofilm with deionized water, a second carbon source, and a dispersant to the lithium iron phosphate precursor, the second carbon source can uniformly cover the surface of the lithium iron phosphate precursor. The second carbon coating, which has better coating properties, is performed during the second sintering, improving the integrity of the carbon layer on the surface of the lithium iron phosphate matrix and further enhancing the electronic conductivity of lithium iron phosphate. Simultaneously, borohydride, deionized water, the second carbon source, and dispersant are added to the mixture of lithium iron phosphate precursor for pretreatment, causing borohydride to release hydrogen elements for boron ion doping. Boron doping increases the hole carrier concentration of the coated carbon layer, further enhancing the conductivity of the carbon layer; Boron doping also increases the number of active sites for lithium-ion transport, reduces the unit cell parameter, and simultaneously improves ionic conductivity; Therefore, boron doping enhances the powder compaction density of the lithium iron phosphate cathode material. Boron doping also improves the electrochemical activity of the lithium iron phosphate cathode material and increases its charge-discharge specific capacity, thereby improving the electrochemical performance of the lithium iron phosphate cathode material in multiple aspects.

The present application also provides a preparation method for lithium manganese iron phosphate cathode material as described in the first aspect, which improves the electrochemical performance of the lithium manganese iron phosphate cathode material from multiple perspectives.

In the second aspect, an embodiment of the present application provides a lithium battery, which comprises a cathode sheet made of lithium iron phosphate cathode material as described in any item of the first aspect, or the cathode sheet is made of lithium manganese iron phosphate cathode material as described in the first aspect.

The lithium battery of the present application uses the lithium iron phosphate cathode material or lithium manganese iron phosphate cathode sheet obtained by the above preparation method. This greatly improves the conductivity and compaction density of the lithium iron phosphate or lithium manganese iron phosphate cathode material, thereby providing the lithium battery with higher energy density and cycling performance.

BRIEF DESCRIPTION OF THE DRAWINGS

In order to more clearly illustrate the technical solutions in the embodiments of the present application, the drawings required for the description of the embodiments or the prior art will be briefly introduced below. It is apparent that the drawings described below are only some embodiments of the present application. For those skilled in the art, other drawings can also be obtained based on these drawings without creative effort.

DETAILED DESCRIPTION

To make the technical problems, technical solutions, and beneficial effects to be solved by the present application clearer, the following examples are provided for further detailed explanation of the present application. It should be understood that the specific embodiments described herein are merely for explaining the present application and are not intended to limit the present application.

In the present application, the term 'and/or' describes the associative relationship of associated objects, indicating that three relationships may exist. For example, A and/or B may indicate: the existence of A alone, the simultaneous existence of A and B, or the existence of B alone. Wherein A and B can be singular or plural. The character "/" generally indicates an "or" relationship between the associated objects.

In the present application, "at least one" means one or more, and "multiple" means two or more. "At least one of the following" or similar expressions refer to any combination of these items, including any combination of a single item or multiple items. For example, "at least one of a, b, or c," or "at least one of a, b, and c," can mean: a, b, c, a~b (i.e., a and b), a~c, b~c, or a~b~c, where a, b, and c can each be singular or plural.

The terms "first" and "second" are used solely for descriptive purposes to distinguish one object from another and should not be understood as indicating or implying relative importance or implicitly specifying the quantity of the indicated technical features. For example, without departing from the scope of the embodiments of the present application, the first XX may also be referred to as the second XX, and similarly, the second XX may also be referred to as the first XX.

Thus, features defined as 'first' and 'second' may explicitly or implicitly comprise one or more of such features.

The terms used in the embodiments of the present application are solely for the purpose of describing particular embodiments and are not intended to limit the present application. The singular forms 'a', 'the', and 'said' as used in the embodiments of the present application and the appended claims are also intended to comprise plural forms unless the context clearly indicates otherwise.

It should be understood that in various embodiments of the present application, the size of the sequence numbers of the above processes does not imply the order of execution. Some or all steps can be executed in parallel or sequentially. The execution order of each process should be determined by its function and internal logic and should not constitute any limitation on the implementation process of the provisions of the present application.

The weight of the relevant components mentioned in the specification of the present application embodiment can not only refer to the specific content of each component but also represent the proportional relationship between the weights of each component. Therefore, as long as the content of the relevant components in the specification of the present application embodiment is proportionally enlarged or reduced, it is within the scope disclosed in the specification of the present application embodiment. Specifically, the mass described in the specification of the present application example can be mass units commonly known in the chemical field, such as µg, mg, g, kg, etc.

Unless otherwise defined, all technical terms used herein have the same meaning as commonly understood by one of ordinary skill in the art. The technical terms used herein are only for the purpose of describing specific examples and are not intended to limit the scope of the present invention.

Unless otherwise specified, various raw materials, reagents, instruments, and equipment used in the present application can be obtained from the market or prepared by existing methods.

The lithium iron phosphate electrode material has an olivine structure. Since Li+ can only be transported along a one-dimensional channel, the diffusion coefficient of lithium ions is relatively low, the conductivity is poor, and the rate performance is low (i.e., the specific capacity is low).

The commonly used modification preparation methods for lithium iron phosphate currently comprise: element doping, crystal nano-crystallization, and surface coating. A single modification preparation method can no longer meet the needs of usage scenarios, and there is still a gap from the theoretical specific capacity of 170 mAh/g for lithium iron phosphate electrode materials.

Figure 1:
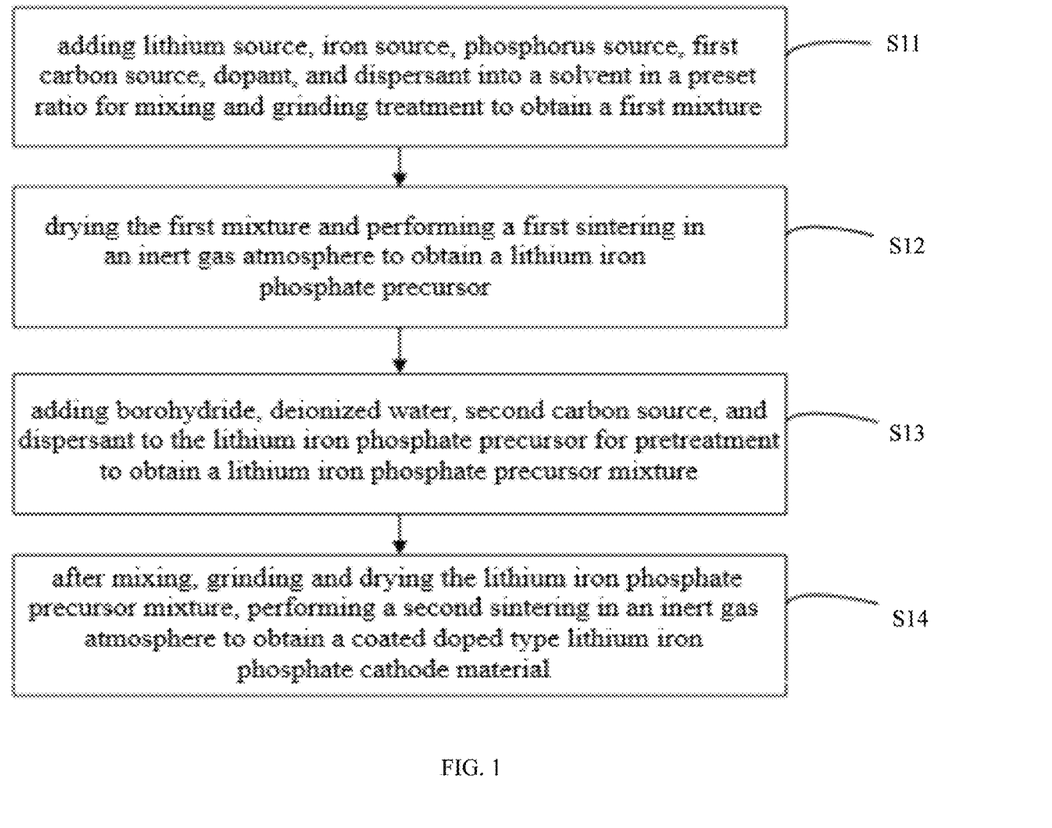
FIG. 1 is a schematic flow diagram of the preparation method of lithium iron phosphate cathode material provided by an embodiment of the present application.

To address the above issues to a certain extent, as shown in FIG. 1, the first aspect of the embodiment of the present application provides a preparation method for lithium iron phosphate cathode material, including:

S11. adding lithium source, iron source, phosphorus source, first carbon source, dopant, and dispersant into a solvent in a preset ratio for mixing and grinding treatment to obtain a first mixture.

S12. drying the first mixture and performing the first sintering in an inert gas atmosphere to obtain the lithium iron phosphate precursor.

S13. adding borohydride, deionized water, second carbon source, and dispersant to the lithium iron phosphate precursor for pretreatment to obtain a lithium iron phosphate precursor mixture.

S14. after grinding and drying the lithium iron phosphate precursor mixture, performing a second sintering in an inert gas atmosphere to obtain a coated doped type lithium iron phosphate cathode material.

In this example, the first doping and the first carbon coating were performed first, followed by the second boron doping and the second carbon coating; The first mixture undergoes a reduction reaction and the first carbon coating during the first sintering to obtain the lithium iron phosphate precursor. Since borohydride nanosheets or borohydride nanofilm are added to the lithium iron phosphate precursor along with deionized water, the second carbon source, and dispersant, the second carbon source can uniformly cover the surface of the lithium iron phosphate precursor. The second carbon coating, which provides better coverage, is performed during the second sintering, improving the integrity of the carbon layer on the surface of the lithium iron phosphate matrix and further enhancing the electronic conductivity of lithium iron phosphate; Simultaneously, borohydride, deionized water, the second carbon source, and dispersant are added to the mixture of lithium iron phosphate precursor for pretreatment, causing the borohydride to release hydrogen elements and perform boron ion doping: on one hand, boron ion doping in the carbon layer increases the hole carrier concentration of the coated carbon layer, further enhancing the conductivity of the carbon layer; Meanwhile, the doping of heterogeneous elements in the carbon layer causes defects in the carbon layer, increasing the number of active sites for lithium ion transport, reducing the unit cell parameter, and simultaneously improving the ionic conductivity. Therefore, by doping boron in the carbon layer, the coated doped type lithium iron phosphate cathode material simultaneously enhances electronic conductivity and ionic conductivity. This synergistic effect increases the rate performance and low-temperature performance of the lithium iron phosphate cathode material. Therefore, boron doping in the carbon layer addresses, to some extent, the low ionic and electronic conductivity of lithium iron phosphate cathode material, significantly improving its electrochemical rate performance. On the other hand, boron tends to dope at phosphorus sites, and the atomic radius of boron is smaller than that of phosphorus. The metal abundance of boron is stronger than that of phosphorus, and the bond energy of the boron-oxygen bond is stronger and shorter than that of the phosphorus-oxygen bond. This results in a reduction in the primary particle volume of the doped lithium iron phosphate material, shortening the ion diffusion channel distances in the '010' direction, thereby enhancing the electrochemical performance of the lithium iron phosphate cathode material.

Therefore, boron doping improves the powder compaction density of the lithium iron phosphate cathode material, enhances the electrochemical activity of the lithium iron phosphate cathode material, and increases the charge-discharge specific capacity of the lithium iron phosphate cathode material, thereby improving the electrochemical performance of the lithium iron phosphate cathode material in multiple aspects. Experimental verification shows that the lithium battery made from the lithium iron phosphate cathode material prepared in the present application can achieve a charge specific capacity of 164.2 mAh/g at 0.1C.

In some examples, step S13 comprises adding borohydride, deionized water, a second carbon source, and a dispersant in predetermined amounts to the lithium iron phosphate precursor for mixing, grinding, and drying to obtain a second mixture; The second mixture, after being irradiated and dried with ultraviolet light, yields a lithium iron phosphate precursor mixture. In this example, the second mixture, after being irradiated and dried with ultraviolet light, causes the hydrogen in the borohydride nanosheets or borohydride nanofilm to volatilize, forming a loose porous structure on the borohydride nanosheets or borohydride nanofilm. Consequently, during the volatilization of hydrogen, the second carbon source uniformly covers the lithium iron phosphate precursor, resulting in a lithium iron phosphate precursor mixture. When the lithium iron phosphate precursor mixture undergoes second sintering, the coverage integrity of the second carbon source on lithium iron phosphate is improved, thereby enhancing the electrochemical performance of the lithium iron phosphate cathode material.

In some examples, the mass ratio of borohydride to the lithium iron phosphate precursor mixture is 1:(10000~100000);

and/or the dopant is one or more of titanium dioxide, magnesium oxide, magnesium hydroxide, niobium pentoxide, vanadium pentoxide, ammonium metavanadate, yttrium oxide, zirconium oxide;

and/or the molar ratio of phosphorus source, iron source, and lithium source is (0.90~1.2):(0.95~1.15):(0.90~1.20);

and/or the mass ratio of the first carbon source to the iron source is (0.03~0.08):1;

and/or the mass ratio of the dispersant to the first mixture in step S11 is (0.005~0.02):1;

and/or the mass ratio of the second carbon source to the lithium iron phosphate precursor mixture in step S13 is (0.04~0.10):1;

and/or the carbon content of the lithium iron phosphate precursor is less than or equal to 0.5%.

In the lithium iron phosphate cathode material of this implementation, if the carbon content of the first carbon source and the second carbon source is below the mass ratio range of this example, it will cause the carbon layer coated on the surface of the lithium iron phosphate matrix to be discontinuous, resulting in poor material conductivity and poor electrochemical performance; If the carbon content of the first carbon source and the second carbon source is higher than the mass ratio range of this example, it will lead to a thicker and overly dense coated carbon layer, resulting in increased resistance to lithium ion migration and reduced electrochemical performance. The carbon content of the first carbon source and the second carbon source within the mass ratio range of this example can improve the coating integrity of the carbon layer, thereby enhancing the electrochemical performance of the lithium iron phosphate cathode material. This example sets the mass ratio range of borohydride to the lithium iron phosphate precursor mixture to avoid excessive or insufficient boron doping in the carbon layer. The boron doping amount within the range of this example can better enhance the conductivity of the lithium iron phosphate material. If the boron doping amount is below the range of this example, it will lead to a low concentration of hole carriers in the carbon layer, and the improvement in carbon layer conductivity will not be significant. A high boron doping level beyond the scope of this example will lead to excessive defects in the carbon layer, disrupting the continuity of the carbon layer, which is also detrimental to the improvement of the material's electrochemical performance. This example also sets the molar ratio of the phosphorus source, iron source, and lithium source, the mass ratio of the dispersant to the first mixture in step S11, and the type of dopant. The molar ratio range of the phosphorus source, iron source, and lithium source in this example allows for a better reaction, avoiding incomplete reactions that could affect the pH value of the cathode material. The mass ratio of the dispersant to the first mixture allows for better uniform dispersion of each component in the solvent, which is water or ethanol. The mass ratio of the dopant to the first mixture is 1:(10000~100000). The type of dopant is selected according to the specific requirements of the lithium battery to meet the needs of the application scenario.

In some examples, step S14 can also be: mixing and grinding the lithium iron phosphate precursor mixture and the manganese source, then drying them, and performing a second sintering in an inert gas atmosphere to obtain a coated doped type lithium manganese iron phosphate cathode material. In this example, the manganese source is mixed with the irradiated lithium iron phosphate precursor mixture and subjected to a second sintering. The manganese source can be uniformly distributed in the porous structure of the lithium iron phosphate precursor mixture, allowing manganese ions to be uniformly doped into the lithium iron phosphate precursor mixture during the second sintering, thereby improving the conductivity of the lithium iron phosphate cathode material and subsequently enhancing its electrochemical performance.

In some examples, the first sintering parameters are: sintering temperature of 400° C.~800° C., constant temperature time during sintering is 2 h~8 h; The second sintering parameters are: sintering temperature of 700° C.~800° C., constant temperature time during sintering is 4 h~8 h. Using the first sintering parameters and second sintering parameters in this example for sintering can effectively carry out the reduction reaction, first carbon coating, and second carbon coating, thereby improving the carbon coating integrity of the lithium iron phosphate cathode material, and further enhancing the electrochemical performance of the lithium iron phosphate cathode material.

Figure 2:
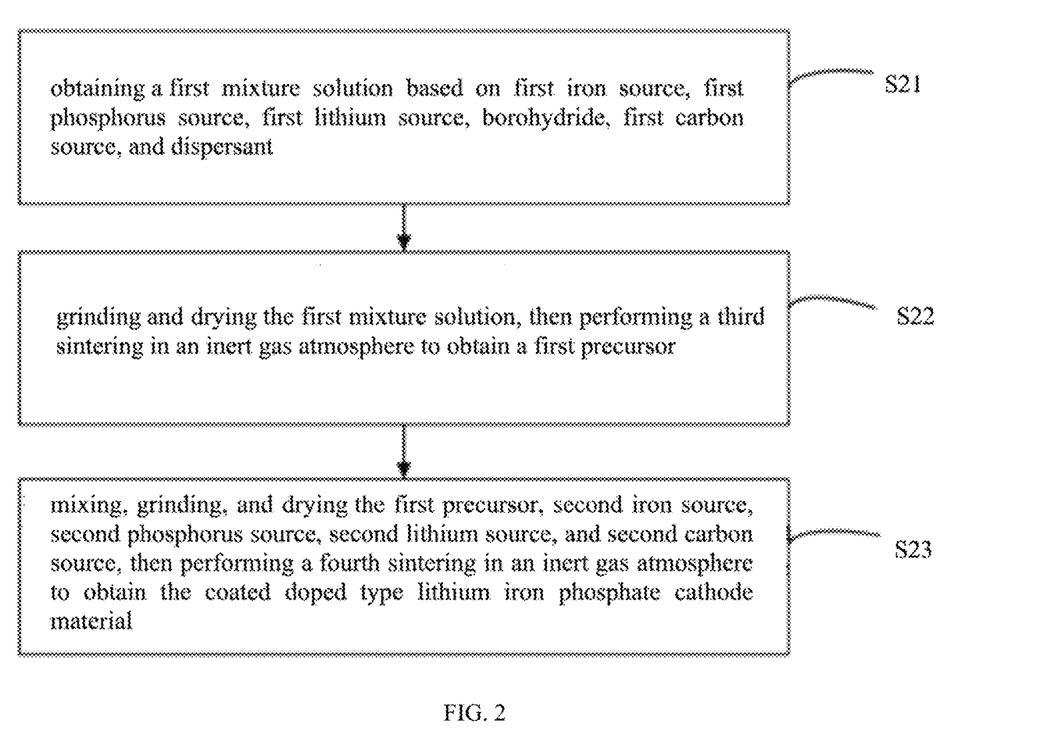
FIG. 2 is a schematic flow diagram of the preparation method of lithium manganese iron phosphate cathode material provided by another embodiment of the present application.

In other examples, as shown in FIG. 2, the preparation method for lithium iron phosphate cathode material can also be:

S21. obtaining a first mixture solution based on first iron source, first phosphorus source, first lithium source, borohydride, first carbon source, and dispersant;

S22. grinding and drying the first mixture solution, then performing a third sintering in an inert gas atmosphere to obtain a first precursor;

S23. mixing, grinding, and drying the first precursor, second iron source, second phosphorus source, second lithium source, and second carbon source, then performing a fourth sintering in an inert gas atmosphere to obtain the coated doped type lithium iron phosphate cathode material.

In this example, boron doping and the first carbon coating are first performed using borohydride, thereby forming a boron-doped first carbon coating layer near the lithium iron phosphate matrix, which improves the conductivity of the lithium iron phosphate cathode material. Then, a second carbon coating is performed, further coating a carbon layer on top of the boron-doped first carbon layer, which further enhances the conductivity of the lithium iron phosphate cathode material, thereby improving the electrochemical performance of the coated doped type lithium iron phosphate cathode material. Among them, the types of the first iron source and the second iron source, the first phosphorus source and the second phosphorus source, and the first lithium source and the second lithium source can be the same or different, chosen according to the specific requirements of the application scenario.

In other examples, the mass-to-volume ratio of borohydride to the first mixture solution is 1 mg:(10~100) mL. Within the mass-to-volume ratio range of this example, lithium iron phosphate can be accommodated as uniformly as possible to facilitate volatilization doping during carbon coating.

In other examples, step S21 comprises: mixing the first iron source, first phosphorus source, and first lithium source to obtain the first mixed solution; Mixing the first mixed solution with borohydride to obtain the second mixed solution; Mixing the first carbon source, dispersant, and the second mixed solution to obtain the first mixture solution. According to the steps of this example, the first mixture solution was formed, lithium iron phosphate was first formed, and then distributed on borohydride. Subsequently, the first carbon source was uniformly coated on the lithium iron phosphate on borohydride through the dispersant, thereby enhancing the effect of boron doping and the first carbon coating, and further improving the electrochemical performance of the coated doped type lithium iron phosphate cathode material.

0041. In other examples, after step S22 and before step S23, it comprises: using ultraviolet light to irradiate the first precursor. In this example, ultraviolet light is used to irradiate the first precursor, causing hydrogen in the borohydride nanosheets or borohydride nanofilm to volatilize, thereby forming a loose porous structure on the borohydride nanosheets or borohydride nanofilm. As a result, during the volatilization of hydrogen, the second carbon source uniformly covers the lithium iron phosphate precursor, obtaining the first precursor. When the first precursor undergoes the fourth sintering, the coverage integrity of the second carbon source on lithium iron phosphate is improved, thereby enhancing the electrochemical performance of the lithium iron phosphate cathode material.

In other examples, step S23 can also be: mixing and grinding the manganese source, first precursor, second iron source, second phosphorus source, second lithium source, and second carbon source, then drying them, and performing the fourth sintering in an inert gas atmosphere to obtain the coated doped type lithium iron phosphate cathode material. In this example, the manganese source is mixed with the irradiated first precursor and subjected to the fourth sintering. The manganese source can be uniformly distributed in the porous structure of the first precursor, allowing manganese ions to be uniformly doped into the first precursor during the second sintering, thereby improving the conductivity of the lithium manganese iron phosphate cathode material and further enhancing its electrochemical performance.

In other examples, the third sintering process is: using a heating rate of 5° C./min~10° C./min to raise the temperature from room temperature to the first temperature; maintaining the first temperature for 1 h~2 h; Then using a heating rate of 3° C./min~5° C./min to raise the temperature from the first temperature to the second temperature; maintaining the second temperature for 1 h~1.5 h. Wherein, the first temperature is 350° C.~450° C., and the second temperature is 550° C.~650° C.; In this implementation, an appropriate heating rate is used for heating and insulation sintering at the set temperature, then a different heating rate is used to heat and perform insulation sintering at a higher set temperature, which can avoid the adverse effects of rapid heating on the material, ensuring the stability of the first carbon coating and first boron doping of the lithium iron phosphate cathode material, and improving the effect of carbon coating.

In other examples, the fourth sintering process is as follows: using a heating rate of 5° C./min~10° C./min to raise the temperature from room temperature to the third temperature; maintaining insulation at the third temperature for 2 h~3 h; Then using a heating rate of 3° C./min~5° C./min to raise the temperature from the third temperature to the fourth temperature; maintaining insulation at the fourth temperature for 3 h~4 h; Then using a heating rate of 1° C./min~3° C./min to raise the temperature from the fourth temperature to the fifth temperature; maintaining insulation at the fifth temperature for 2 h~4 h. Wherein, the third temperature is 350° C.~400° C., the fourth temperature is 600° C.~700° C., and the fifth temperature is 700° C.~800° C. In this example, a three-stage heating rate is used for heating, and insulation sintering is performed at three set temperatures. This approach avoids the adverse effects of rapid heating on the material, ensures the structural stability of the second carbon coating of the lithium iron phosphate cathode material, and improves the integrity of the second carbon coating.

In some examples, the lithium source comprises at least one of lithium hydroxide, lithium oxalate, lithium carbonate, lithium acetate, lithium phosphate, lithium dihydrogen phosphate, dilithium hydrogen phosphate, lithium chloride, and lithium nitrate; And/or, the dispersant comprises at least one of citric acid, succinic acid, tripropyl phosphate, dibutyl phosphate, polyamide silicone oil, methylcyclosiloxane, sodium dodecylbenzenesulfonate, and sodium octylbenzenesulfonate; And/or, the first carbon source comprises at least one of glucose, sucrose, starch, citric acid, amino acid, polyethylene glycol, and polyvinylidene fluoride; And/or, the phosphorus source comprises at least one of ammonium phosphate, ammonium dihydrogen phosphate, diammonium hydrogen phosphate, phosphoric acid, iron phosphate, lithium phosphate, and lithium dihydrogen phosphate; And/or, the iron source comprises at least one of ferrous oxalate, ferrous acetate, ferrous chloride, ferrous sulfate, iron oxide, iron phosphate, ferric nitrate, ferric chloride, ferric sulfate, ferric hydroxide, ferric citrate, and ferric acetate; And/or, the manganese source is one or more combinations of manganese dihydrogen phosphate, manganese tetroxide, manganese dioxide, manganese oxide, and manganese carbonate; And/or, the second carbon source comprises at least one of glucose, sucrose, starch, citric acid, amino acid, polyethylene glycol, and polyvinylidene fluoride, excluding the first carbon source; The inert gas comprises any one of nitrogen, nitrogen-hydrogen mixed gas, argon, or hydrogen-argon mixed gas. This example sets the types of lithium source, carbon source, phosphorus source, iron source, manganese source, dispersant, and inert gas, providing more options that are conducive to selection based on specific usage scenario requirements. At the same time, the diversification of sources also reduces production costs. Among them, the types of the first carbon source and the second carbon source can be the same or different and can be selected according to the specific usage scenario requirements. This example does not impose restrictions.

To ensure that the above implementation details and operations of the present application can be clearly understood by those skilled in the art, and to significantly demonstrate the improved performance of the lithium iron phosphate cathode material preparation method and lithium battery in the present application example, the following examples are provided to illustrate the above technical solution.

Example 1

Mixing and grinding 1.04 parts of phosphorus source, 1 part of iron source, 1.04 parts of lithium source, 3% of the first carbon source relative to the mass of the iron source, 10 ppm of dopant relative to the first mixture, and 0.5% of dispersant relative to the first mixture in ethanol solvent to obtain the first mixture; Drying the first mixture and perform the first sintering in a nitrogen atmosphere, where the sintering temperature during the sintering process is 400° C., and the constant temperature time during sintering is 2 h, to obtain the lithium iron phosphate precursor; Adding 10 ppm of borohydride, deionized water, 1% of the second carbon source relative to the mass of the lithium iron phosphate precursor mixture, and 0.5% dispersant relative to the lithium iron phosphate precursor mixture into the lithium iron phosphate precursor for pretreatment to obtain a lithium iron phosphate precursor mixture; After grinding and drying the lithium iron phosphate precursor mixture, performing a second sintering in a nitrogen atmosphere. The sintering temperature during the sintering process is 700° C., and the constant temperature time during sintering is 4 hours, resulting in a coated doped type of lithium iron phosphate cathode material 1.

Example 2: The difference from Example 1 is that the parameter values are adjusted to the central values:

According to molar parts, adding 1.04 parts of phosphorus source, 1 part of iron source, 1.04 parts of lithium source, 5.5% of the first carbon source relative to the mass of the iron source, 55 ppm of dopant relative to the first mixture, and 1.25% of dispersant relative to the first mixture to the ethanol solvent for mixing and grinding treatment to obtain the first mixture; Drying the first mixture and subjecting to the first sintering in a nitrogen atmosphere, with a sintering temperature of 600° C. and a constant temperature time of 5 h during the sintering process, to obtain the lithium iron phosphate precursor; Adding 55 ppm of borohydride, deionized water, 7% of the second carbon source relative to the mass of the lithium iron phosphate precursor mixture, and 1.25% dispersant relative to the lithium iron phosphate precursor mixture into the lithium iron phosphate precursor for pretreatment to obtain a lithium iron phosphate precursor mixture. After grinding and drying the lithium iron phosphate precursor mixture, performing a second sintering in a nitrogen atmosphere. The sintering temperature during the sintering process is 750° C., and the constant temperature time during sintering is 6 h, resulting in a coated doped type lithium iron phosphate cathode material 2.

Example 3: The difference from Example 1 is that the parameter values of each component are adjusted to the upper limit:

According to molar parts, adding 1.04 parts of phosphorus source, 1 part of iron source, 1.04 parts of lithium source, 8% of the first carbon source relative to the mass of the iron source, 100 ppm of dopant relative to the first mixture, and 2% of dispersant relative to the first mixture to the ethanol solvent for mixing and grinding treatment to obtain the first mixture; Drying the first mixture and subjecting to first sintering in a nitrogen atmosphere, with a sintering temperature of 800° C. and a constant temperature time of 8 h during the sintering process, to obtain the lithium iron phosphate precursor; Adding 100 ppm of borohydride, deionized water, 10% of the second carbon source relative to the mass of the lithium iron phosphate precursor mixture, and 2% dispersant relative to the lithium iron phosphate precursor mixture into the lithium iron phosphate precursor for pretreatment to obtain a lithium iron phosphate precursor mixture. After grinding and drying the lithium iron phosphate precursor mixture, performing a second sintering in a nitrogen atmosphere. The sintering temperature during the sintering process is 800° C., and the constant temperature time during sintering is 8 h, resulting in a coated doped type of lithium iron phosphate cathode material 3.

Example 4: The difference from Example 1 lies in using another preparation method, and the parameter values of each component are taken as the lower limit:

Obtaining the first mixture solution based on a molar ratio of 1.04 parts of the first phosphorus source, 1.0 part of the first iron source, 1.04 parts of the first lithium source, a mass-to-volume ratio of 1 mg:10 mL of borohydride relative to the first mixture solution, 3% of the first carbon source relative to the mass of the first mixture solution, and 0.5% of the dispersant relative to the first mixture solution; grinding and drying the first mixture solution, then performing a third sintering in a nitrogen atmosphere. The sintering process involves heating at a rate of 5° C./min from room temperature to the first temperature of 350° C.; maintaining insulation at the first temperature of 350° C. for 1 hour; Then, using a heating rate of 3° C./min from the first temperature of 350° C. to the second temperature of 550° C.; maintaining at the second temperature of 550° C. for 1 h; obtaining the first precursor; Mixing and grinding the first precursor, 0.90 parts of the second phosphorus source, 0.95 parts of the second iron source, 0.90 parts of the second lithium source, and 1% of the mass of the first precursor of the second carbon source, then drying them. Conducting the fourth sintering in a nitrogen atmosphere, with the sintering process adopting a heating rate of 5° C./min from room temperature to the third temperature of 350° C.; maintaining at the third temperature of 350° C. for 2 h; Then using a heating rate of 3° C./min from the third temperature of 350° C. to the fourth temperature of 600° C.; maintaining at the fourth temperature of 600° C. for 3 hours; Then using a heating rate of 1° C./min from the fourth temperature of 600° C. to the fifth temperature of 700° C.; maintaining at the fifth temperature of 700° C. for 2 hours; to obtain the coated doped type lithium iron phosphate cathode material 4.

Example 5: The difference from Example 4 is that the parameter values of each component are taken as the central value:

Obtaining the first mixture solution based on 1.04 moles of the first phosphorus source, 1.0 mole of the first iron source, 1.04 moles of the first lithium source, a mass-to-volume ratio of 1 mg:10 mL of borohydride relative to the first mixture solution, 5.5% of the first carbon source relative to the mass of the first mixture solution, and 1.25% of the dispersant relative to the first mixture solution; After grinding and drying the first mixture solution, performing the third sintering in a nitrogen atmosphere. The sintering process involves heating from room temperature to the first temperature of 400° C. at a heating rate of 7.5° C./min; maintaining the first temperature of 400° C. for 1.5 hours; Then, heating from the first temperature of 400° C. to the second temperature of 600° C. at a heating rate of 4° C./min; maintaining the second temperature of 600° C. for 1.25 hours; to obtain the first precursor; Mixing, grinding, and drying the first precursor, 1.05 parts of the second phosphorus source, 1.05 parts of the second iron source, 1.05 parts of the second lithium source, and 7% of the first precursor mass of the second carbon source. Then, performing the fourth sintering in a nitrogen atmosphere. The sintering process involves heating from room temperature to the third temperature of 400° C. at a heating rate of 7.5° C./min; maintaining the third temperature of 400° C. for 2.5 hours; Then using a heating rate of 4° C./min from the third temperature of 400° C. to the fourth temperature of 650° C.; maintaining at the fourth temperature of 650° C. for 3 hours; Then using a heating rate of 2° C./min from the fourth temperature of 650° C. to the fifth temperature of 750° C.; maintaining at the fifth temperature of 750° C. for 5 hours; to obtain the coated doped type lithium iron phosphate cathode material 5.

Example 6: The difference from Example 4 is that the parameter values of each component are taken as the upper limit values:

Obtaining the first mixture solution based on 1.04 molar parts of the first phosphorus source, 1.0 molar part of the first iron source, 1.04 molar parts of the first lithium source, a mass-to-volume ratio of 1 mg:100 mL of borohydride relative to the first mixture solution, 8% of the first carbon source relative to the mass of the first mixture solution, and 2% of the dispersant relative to the first mixture solution; After grinding and drying the first mixture solution, performing the third sintering in a nitrogen atmosphere. The sintering process involves heating from room temperature to the first temperature of 450° C. at a heating rate of 10° C./min; maintaining the first temperature of 450° C. for 2 hours; Then, heating from the first temperature of 450° C. to the second temperature of 650° C. at a heating rate of 5° C./min; maintaining the second temperature of 650° C. for 1.5 hours; to obtain the first precursor; Mixing, grinding, and drying the first precursor, 1.20 parts of the second phosphorus source, 1.15 parts of the second iron source, 1.20 parts of the second lithium source, and a second carbon source accounting for 10% of the mass of the first precursor. Then, performing the fourth sintering in a nitrogen atmosphere. The sintering process involves heating from room temperature to the third temperature of 400° C. at a heating rate of 10° C./min; maintaining the third temperature of 400° C. for 3 hours; Then using a heating rate of 5° C./min from the third temperature of 400° C. to the fourth temperature of 700° C.; maintaining at the fourth temperature of 700° C. for 4 hours; Then using a heating rate of 3° C./min from the fourth temperature of 700° C. to the fifth temperature of 800° C.; maintaining at the fifth temperature of 800° C. for 4 hours; to obtain the coated doped type lithium iron phosphate cathode material 6.

Example 7: Adding the manganese source to the lithium iron phosphate precursor mixture for mixing, the rest is the same as in Example 2, to obtain the coated doped type lithium manganese iron phosphate cathode material 7.

Example 8: Adding the manganese source to the lithium iron phosphate precursor mixture for mixing, the rest is the same as in Example 5, to obtain the coated doped type lithium manganese iron phosphate cathode material 8.

Comparative Example 1: Compared to Example 2, no borohydride was added, and the other conditions were the same, resulting in a coated doped type comparative lithium iron phosphate cathode material.

Comparative Example 2: Compared to Example 5, no borohydride was added, and the other conditions were the same, resulting in a coated doped type comparative lithium manganese iron phosphate cathode material.

The lithium iron phosphate cathode materials obtained from Examples 1 to 6 and Comparative Examples 1 and 2 were assembled into coin cells to test the initial discharge specific capacity at 0.1C rate and the initial discharge specific capacity at 1C rate. The comparative data are shown in Table 1.

Table 1 shows the initial charge specific capacity at 0.1C rate, initial discharge specific capacity at 0.1C rate, and initial discharge specific capacity at 1C rate for the lithium iron phosphate cathode materials obtained from Examples 1 to 6 and Comparative Example 1.

|  | Initial charge specific capacity at 0.1 C rate/mAh/g | Initial discharge specific capacity at 0.1 C rate/mAh/g | Initial discharge specific capacity at 1 C rate/mAh/g |
| --- | --- | --- | --- |
| Example 1 | 163.5 | 163.4 | 152.1 |
| Example 2 | 164.2 | 163.8 | 152.4 |
| Example 3 | 163.7 | 163.5 | 151.9 |
| Example 4 | 162.3 | 161.3 | 149.5 |
| Example 5 | 162.8 | 162.3 | 150.1 |
| Example 6 | 162.5 | 161.9 | 149.8 |
| Comparative Example 1 | 161.2 | 159.8 | 140.8 |

Figure 3:
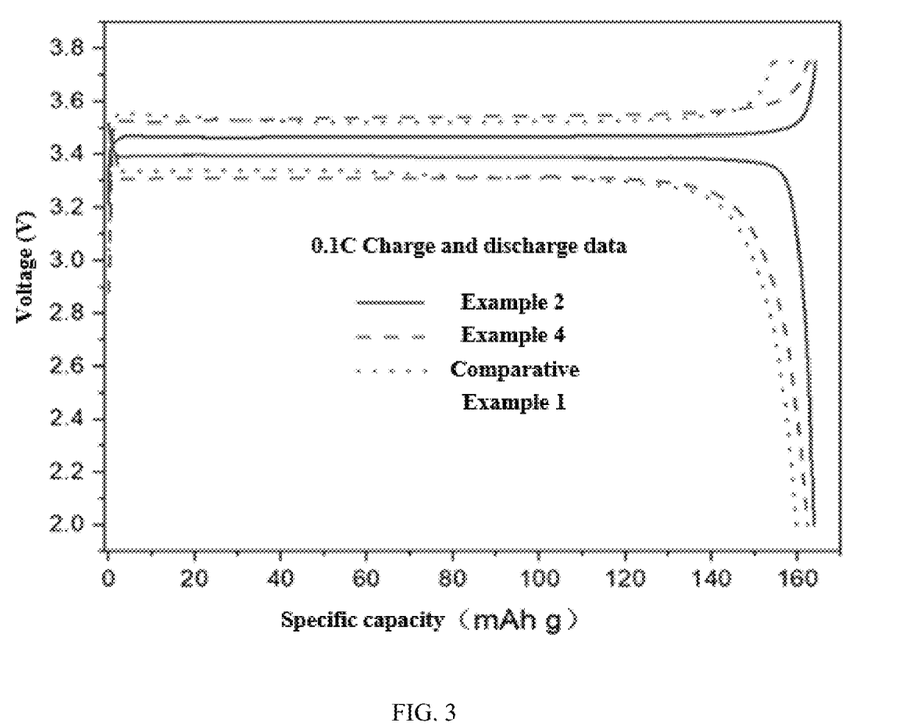
FIG. 3 is a schematic diagram of the 0.1C charge-discharge specific capacity data of the lithium iron phosphate cathode material provided by an embodiment of the present application.
Figure 4:
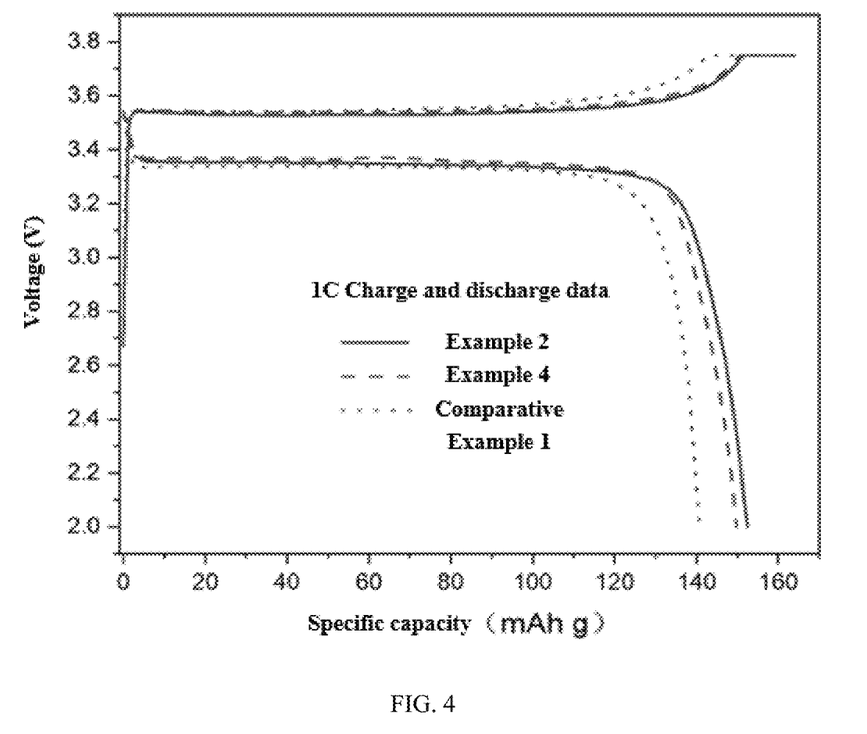
FIG. 4 is a schematic diagram of the 1C charge-discharge specific capacity data of the lithium iron phosphate cathode material provided by an embodiment of the present application.

As shown in FIGS. 3 and 4, FIG. 3 is a schematic diagram of the charge-discharge specific capacity test data at 0.1C for the lithium iron phosphate cathode material of Example 2, and FIG. 4 is a schematic diagram of the charge-discharge specific capacity test data at 1C for the lithium iron phosphate cathode material of Example 2. From Table 1, FIG. 3, and FIG. 4, it can be seen that Example 2, which involves first sintering carbon coating, then borohydride doping, and a second sintering carbon coating, has the highest charge-discharge specific capacity. Example 5, which involves first borohydride doping and first sintering carbon coating followed by a second sintering carbon coating, has the second highest charge-discharge specific capacity. The comparative example 1 of the existing technology has the lowest charge-discharge specific capacity.

Table 2 shows the first charge specific capacity at 0.1C rate, the first discharge specific capacity at 0.1C rate, and the first discharge specific capacity at 1C rate for the lithium manganese iron phosphate cathode materials obtained in Examples 7, 8, and Comparative Example 2, respectively:

|  | Initial charge specific capacity at 0.1 C rate/mAh/g | Initial discharge specific capacity at 0.1 C rate/mAh/g | Initial discharge specific capacity at 1 C rate/mAh/g |
| --- | --- | --- | --- |
| Example 7 | 161.3 | 158.1 | 154.6 |
| Example 8 | 160.7 | 155.4 | 151.5 |
| Comparative Example 2 | 157.5 | 153.3 | 143 |

Figure 5:
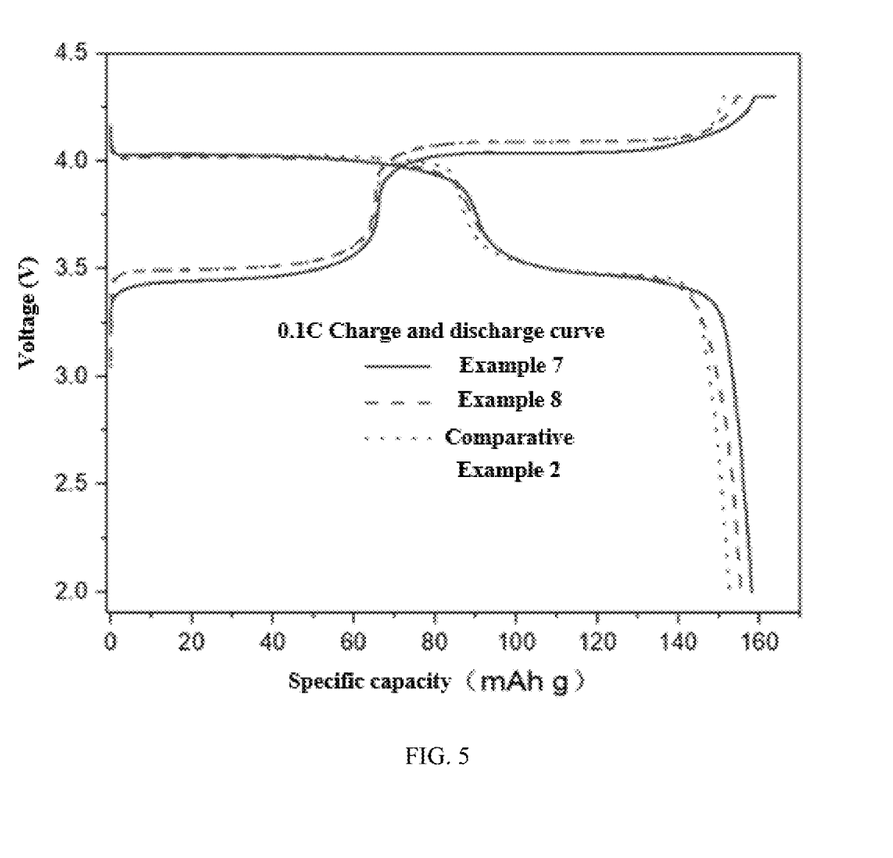
FIG. 5 is a schematic diagram of the 0.1C charge-discharge specific capacity data of the lithium iron phosphate cathode material provided by another embodiment of the present application.
Figure 6:
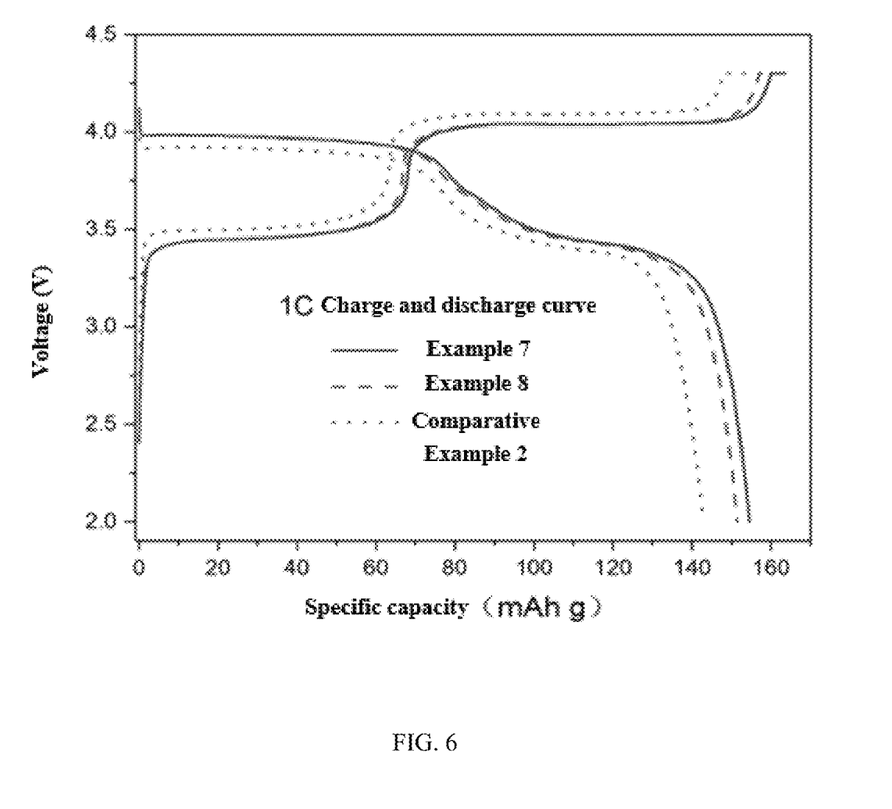
FIG. 6 is a schematic diagram of the 1C charge-discharge specific capacity data of the lithium manganese iron phosphate cathode material provided by another embodiment of the present application.

As shown in FIGS. 5 and 6, FIG. 5 is a schematic diagram of the charge-discharge specific capacity test data at 0.1C for the lithium manganese iron phosphate cathode material in Example 7, and FIG. 6 is a schematic diagram of the charge-discharge specific capacity test data at 1C for the lithium manganese iron phosphate cathode material in Example 8. From Table 2, FIG. 5, and FIG. 6, it can be seen that the charge-discharge specific capacity is highest in Example 7, where the first sintering carbon coating is followed by borohydride doping and a second sintering carbon coating. In Example 8, where borohydride doping and the first sintering carbon coating are followed by a second sintering carbon coating, the charge-discharge specific capacity is second highest. The charge-discharge specific capacity is lowest in Comparative Example 1 of the existing technology.

It should be understood that the order of the steps in the above examples does not imply the sequence of execution. The execution order of each process should be determined by its function and internal logic and should not constitute any limitation on the implementation process of the examples in the present application.

In the above examples, the description of each example has its own emphasis. Parts not detailed or recorded in a particular example can refer to the relevant description in other examples.

The above examples are only used to illustrate the technical solution of the present application and are not intended to limit it; Although the present application has been described in detail with reference to the foregoing examples, those skilled in the art should understand that they can still modify the technical solutions described in the foregoing examples or make equivalent replacements for some of the technical features; These modifications or replacements do not deviate the essence of the corresponding technical solutions from the spirit and scope of the technical solutions of the embodiments of the present application and should be comprised within the protection scope of the present application.

What is claimed is:

1. A preparation method for lithium iron phosphate cathode material, characterized in that comprising:
   S11. adding lithium source, iron source, phosphorus source, first carbon source, dopant, and dispersant into a solvent in a preset ratio for mixing and grinding treatment to obtain a first mixture;
   S12. drying the first mixture and performing a first sintering in an inert gas atmosphere to obtain a lithium iron phosphate precursor;
   S13. adding borohydride, deionized water, second carbon source, and dispersant to the lithium iron phosphate precursor for pretreatment to obtain a lithium iron phosphate precursor mixture, wherein the borohydride is borohydride nanosheet or borohydride nanofilm;
   S14. after grinding and drying the lithium iron phosphate precursor mixture, performing a second sintering in an inert gas atmosphere to obtain a coated doped type lithium iron phosphate cathode material,
   wherein the step S13 comprises:
   adding the borohydride, the deionized water, the second carbon source, and the dispersant into the lithium iron phosphate precursor in predetermined amounts for mixing, grinding, and drying to obtain a second mixture;
   wherein the second mixture after ultraviolet light irradiation and drying is used to obtain the lithium iron phosphate precursor mixture.

2. The preparation method according to claim 1, characterized in that the mass ratio of the borohydride to the lithium iron phosphate precursor mixture is 1:(10000~100000);
   and/or the dopant is one or more of titanium dioxide, magnesium oxide, magnesium hydroxide, niobium pentoxide, vanadium pentoxide, ammonium metavanadate, yttrium oxide, zirconium oxide;
   and/or the molar ratio of the phosphorus source, iron source, and lithium source is (0.90~1.2):(0.95~1.15):(0.90~1.20);
   and/or the mass ratio of the first carbon source to the iron source is (0.03~0.08):1;
   and/or in step S11, the mass ratio of the dispersant to the first mixture is (0.005~0.02):1;
   and/or in step S13, the mass ratio of the second carbon source to the lithium iron phosphate precursor mixture is (0.04~0.10):1;
   and/or the carbon content of the lithium iron phosphate precursor is less than or equal to 0.5%.

3. The preparation method according to claim 1, characterized in that the step S14 further comprises: mixing and grinding the lithium iron phosphate precursor mixture and a manganese source, drying them, and then performing a second sintering in an inert gas atmosphere to obtain the coated doped type lithium manganese iron phosphate cathode material.

4. The preparation method according to claim 1, characterized in that the parameters for the first sintering are: sintering temperature is 400° C.~800° C., and the constant temperature time during sintering is 2 h~8 h;
   wherein the parameters for the second sintering are: sintering temperature is 700° C.~800° C., and the constant temperature time during sintering is 4 h~8 h.

5. The preparation method according to claim 1, characterized in that it can also be:
   S21. obtaining a first mixture solution based on first iron source, first phosphorus source, first lithium source, borohydride, first carbon source, and dispersant;
   S22. grinding and drying the first mixture solution, then performing a third sintering in an inert gas atmosphere to obtain a first precursor;
   S23. mixing, grinding, and drying the first precursor, second iron source, second phosphorus source, second lithium source, and second carbon source, then performing a fourth sintering in an inert gas atmosphere to obtain the coated doped type lithium iron phosphate cathode material,
   wherein the step S21 comprises:
   mixing the first iron source, the first phosphorus source, and the first lithium source to obtain a first mixed solution;

mixing the first mixed solution with the borohydride to obtain a second mixed solution;

mixing the first carbon source, the dispersant, and the second mixed solution to obtain the first mixture solution;

after step S22 and before step S23 comprises:

irradiating the first precursor with ultraviolet light.

6. The preparation method according to claim 5, characterized in that the step S23 further comprises: mixing and grinding a manganese source, the first precursor, the second iron source, the second phosphorus source, the second lithium source, and the second carbon source, followed by drying, and then performing the fourth sintering in an inert gas atmosphere to obtain the coated doped type lithium manganese iron phosphate cathode material.

7. The preparation method according to claim 6, characterized in that the third sintering process comprises:

heating from room temperature to the first temperature at a heating rate of 5° C./min to 10° C./min;

maintaining at the first temperature for 1 h~2 h;

then using a heating rate of 3° C./min~5° C./min from the first temperature to the second temperature;

maintaining at the second temperature for 1 h~1.5 h;

the fourth sintering process is:

using a heating rate of 5° C./min~10° C./min to heat from room temperature to the third temperature;

maintaining at the third temperature for 2 h~3 h;

then using a heating rate of 3° C./min~5° C./min from the third temperature to the fourth temperature;

maintaining at the fourth temperature for 3 h~4 h;

then using a heating rate of 1° C./min~3° C./min from the fourth temperature to the fifth temperature;

maintaining at the fifth temperature for 2 h~4 h;

wherein, the first temperature is 350° C.~450° C., and the second temperature is 550° C.~650° C.;

the third temperature is 350° C.~400° C., the fourth temperature is 600° C.~700° C., and the fifth temperature is 700° C.~800° C.

* * * * *